United States Patent
Xu

(10) Patent No.: US 9,601,042 B2
(45) Date of Patent: Mar. 21, 2017

(54) LIGHT SENSING TOUCH PANEL AND LOW-POWER DRIVING CONTROL METHOD THEREOF

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 465 days.

(21) Appl. No.: 14/240,713

(22) PCT Filed: Jan. 9, 2014

(86) PCT No.: PCT/CN2014/070382
§ 371 (c)(1),
(2) Date: Feb. 24, 2014

(87) PCT Pub. No.: WO2015/096216
PCT Pub. Date: Jul. 2, 2015

(65) Prior Publication Data
US 2015/0187245 A1    Jul. 2, 2015

(30) Foreign Application Priority Data
Dec. 27, 2013   (CN) .......................... 2013 1 0734677

(51) Int. Cl.
G06F 3/041    (2006.01)
G09G 3/06     (2006.01)
G06F 1/32     (2006.01)

(52) U.S. Cl.
CPC ............. *G09G 3/06* (2013.01); *G06F 1/3262* (2013.01); *G06F 3/041* (2013.01); *G06F 3/0416* (2013.01)

(58) Field of Classification Search
CPC combination set(s) only.
See application file for complete search history.

(56) References Cited

U.S. PATENT DOCUMENTS

| 2010/0245295 A1* | 9/2010 | Kimpara | G06F 3/0418 345/179 |
| 2012/0098793 A1* | 4/2012 | Cheng | G06F 3/042 345/175 |
| 2015/0205429 A1* | 7/2015 | Nie | G06F 3/0416 345/175 |

* cited by examiner

*Primary Examiner* — Robin Mishler
(74) *Attorney, Agent, or Firm* — Andrew C. Cheng

(57) ABSTRACT

The present invention discloses a low-power driving control method of light sensing touch panel, which comprises the following steps: measuring the ambient light field intensity of the light sensing touch panel, and outputting a light field signal; outputting an amplification signal adapting to a touch signal according to the intensity of the light field signal; amplifying the touch signal according to the amplification signal, and driving the light sensing touch panel. The present invention further discloses a light sensing touch panel. The light sensing touch panel and the low-power driving control method thereof according to the present invention can reduce the power consumption of the touch panel without affecting the touch sensitivity.

6 Claims, 3 Drawing Sheets

LIGHT SENSING TOUCH PANEL AND LOW-POWER DRIVING CONTROL METHOD THEREOF

This application is claiming a priority arisen from a patent application, entitled with "Light Sensing Touch Panel and Low-Power Driving Control Method Thereof", submitted to China Patent Office on Dec. 27, 2013, designated with an Application Number 201310734677.3. The whole and complete disclosure of such patent application is hereby incorporated by reference.

BACKGROUND OF THE INVENTION

1. Field of the Invention

The present invention relates to the technology fields of image display, and in particular to a light sensing touch panel and a low-power driving control method thereof.

2. The Related Arts

In the existing technology, low cost, high yield, large size and high reliability have become the basic direction of the development of the touch technology. In order to achieve the above objective, in the process, ITO sensor and cover lens can be integrated together even with TFT, which can reduce production costs, make it thinner, and avoid the problem of poor bonding. In materials, it can develop organic or inorganic alternative materials of ITO, master the flexible film and substrate technology, or utilize new plastic material instead of the more expensive glass or PMMA plastic plate in the materials of the cover lens. In structure, it develops the built-in touch structure such as on-cell and in-cell structure.

FIG. 5 shows a schematic view illustrating the use of the photosensitive type in-cell touch technology according to the existing technology. Wherein, the photosensitive type in-cell touch technology has multiple implementations. A typical implementation is: forming a larger current on the light sensing switch of a first substrate 9 under finger touch or irradiation of the laser pointer 8, and determining the touch position by considering the switch position generating the current. The existing problem of the touch panel is as follows. In order to control the consumption of the touch panel, it is usually driven by a small signal. However, the noise ratio of the small signal is relatively poor, so the misjudgment rate is higher. Therefore, in order to improve the detection capability of signal, it needs to amplify the signal to drive the touch panel. Although there is structure using the default magnification to amplify the signal in the existing technology, in some conditions, too large magnification leads to more consumption, which is not really close to user needs.

In summary, in order to improve the detection capability of signal, more accurate judgments, and positioning touch action, amplifying the signal is the most important.

SUMMARY OF THE INVENTION

The technical issue to be solved by the present invention is to provide a light sensing touch panel and a low-power driving control method thereof, which can reduce the power consumption of the touch panel without affecting the touch sensitivity.

In order to solve the technical issue, the present invention provides a low-power driving control method of light sensing touch panel, which comprises the following steps: measuring the ambient light field intensity of the light sensing touch panel, and outputting a light field signal; outputting an amplification signal adapting to a touch signal according to the intensity of the light field signal, which comprises the following steps: the step of the driving circuit of the light sensing touch panel being turned on when there is no touch and being turned off when there is touch; the step of considering if the intensity of the light field signal is larger than the predetermined value of the stored light field signal, if it is YES, choosing a first magnification from the stored amplification value to adapt to the touch signal; if it is No, choosing a second magnification from the stored amplification value to adapt to the touch signal; wherein, the first magnification is larger than the second magnification; and the step of adjusting the amplification value to adapt to the touch signal; and amplifying the touch signal according to the amplification signal, and driving the light sensing touch panel.

In order to solve the technical issue, the present invention further provides a low-power driving control method of light sensing touch panel, which comprises the following steps: measuring the ambient light field intensity of the light sensing touch panel, and outputting a light field signal; outputting an amplification signal adapting to a touch signal according to the intensity of the light field signal; and amplifying the touch signal according to the amplification signal, and driving the light sensing touch panel.

Wherein, the step of outputting an amplification signal adapting to a touch signal according to the intensity of the light field signal comprises the following steps: the step of the driving circuit of the light sensing touch panel being turned on when there is no touch and being turned off when there is touch; the step of considering if the intensity of the light field signal is larger than the predetermined value of the stored light field signal, if it is YES, choosing a first magnification from the stored amplification value to adapt to the touch signal; if it is No, choosing a second magnification from the stored amplification value to adapt to the touch signal; wherein, the first magnification is larger than the second magnification.

Wherein, the step of outputting an amplification signal adapting to a touch signal according to the intensity of the light field signal further comprises: the step of adjusting the amplification value to adapt to the touch signal.

Wherein, the step of outputting an amplification signal adapting to a touch signal according to the intensity of the light field signal comprises the following steps: the step of the driving circuit of the light sensing touch panel being turned off when there is no touch and being turned on when there is touch; the step of considering if the intensity of the light field signal is larger than the predetermined value of the stored light field signal, if it is YES, choosing a first magnification from the stored amplification value to adapt to the touch signal; if it is No, choosing a second magnification from the stored amplification value to adapt to the touch signal; wherein, the first magnification is smaller than the second magnification.

Wherein, the step of outputting an amplification signal adapting to a touch signal according to the intensity of the light field signal further comprises: the step of adjusting the amplification value to adapt to the touch signal.

In order to solve the technical issue, the present invention further provides a light sensing touch panel, which comprises a driving circuit, wherein, the driving circuit at least comprises: a light sensor, which is used to measure the ambient light field intensity of the light sensing touch panel and output a light field signal; a touch signal amplifying controller, which is used to output an amplification signal adapting to a touch signal according to the intensity of the light field signal; and an amplifier, which is used to amplify the touch signal according to the amplification signal and drive the light sensing touch panel; wherein, the light sensor, the touch signal amplifying controller, and the amplifier are connected in sequence.

Wherein, the touch signal amplifying controller is further connected with an external switch used to adjust the amplification value to adapt to the touch signal.

Wherein, the driving circuit further comprises a photodiode connected to the amplifier.

Wherein, the touch signal amplifying controller comprises: a storage, which is used to store the amplification value; a determiner, which is used to consider the intensity of the light field signal according to the light field signal; and a selection controller, which is used to choose a magnification adapting to the touch signal, the storage and the determiner being respectively connected with the selection controller; wherein, the driving circuit of the light sensing touch panel is turned on when there is no touch and is turned off when there is touch; the determiner considers if the intensity of the light field signal is larger than the predetermined value of the stored light field signal, if it is YES, choose a first magnification from the stored amplification value to adapt to the touch signal; if it is No, choose a second magnification from the stored amplification value to adapt to the touch signal; wherein, the first magnification is larger than the second magnification.

Wherein, the driving circuit of the light sensing touch panel is turned off when there is no touch and is turned on when there is touch; the determiner considers if the intensity of the light field signal is larger than the predetermined value of the stored light field signal, if it is YES, choose a first magnification from the stored amplification value to adapt to the touch signal; if it is No, choose a second magnification from the stored amplification value to adapt to the touch signal; wherein, the first magnification is smaller than the second magnification.

In the light sensing touch panel and the low-power driving control method thereof according to the embodiment of the present invention, because the light sensor can measure the ambient light field intensity of the light sensing touch panel and output the light field signal to the touch signal amplifying controller, the touch signal amplifying controller outputs an amplification signal adapting to the touch signal according to the intensity of the light field signal, the amplifier amplifies the touch signal according to the amplification signal and drives the light sensing touch panel, which avoids the high power consumption problems of the touch panel resulted from using the default magnification to amplify the signal. It can reduce the power consumption of the touch panel without affecting the touch sensitivity.

DETAILED DESCRIPTION OF THE PREFERRED EMBODIMENTS

A clear and complete description of the technical solution according to the embodiment of the present invention will be given as follows accompanying with the drawings. Apparently, the embodiments described below show only example embodiments of the present invention and not all embodiments. For those having ordinary skills in the art, other embodiments obtained from these drawings without paying any creative effort are considered encompassed in the scope of protection defined by the clams of the present invention.

Figure 1:
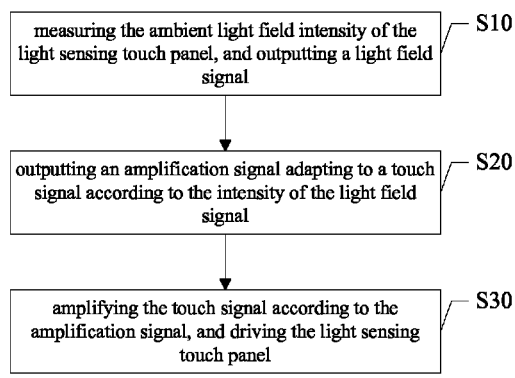
FIG. 1 is a first flow diagram of the low-power driving control method of light sensing touch panel according to the present invention.
Figure 2:
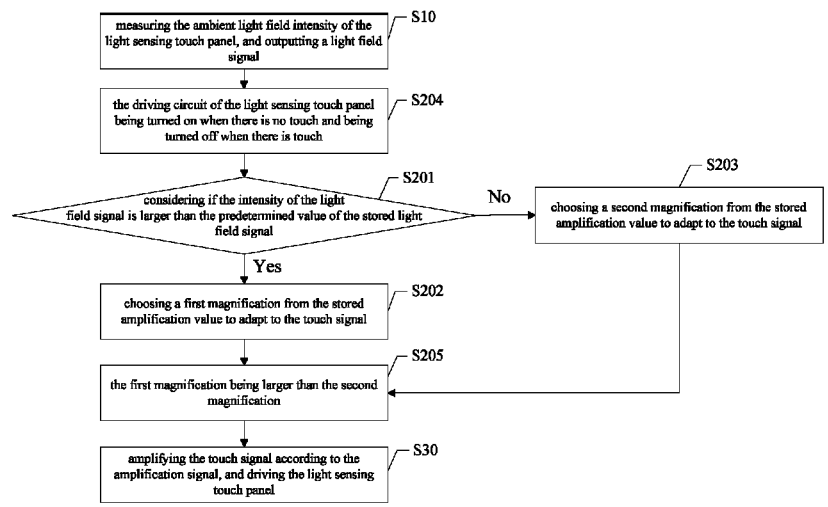
FIG. 2 is a second flow diagram of the low-power driving control method of light sensing touch panel according to the present invention.

Referring to FIGS. 1 and 2, it shows the flow diagram of the low-power driving control method of light sensing touch panel according to the present invention.

The low-power driving control method of light sensing touch panel according to the present invention mainly comprises the step S204 of the driving circuit of the light sensing touch panel being turned on when there is no touch and being turned off when there is touch, which specifically comprises the following steps:

S10, measuring the ambient light field intensity of the light sensing touch panel, and outputting a light field signal;

S20, outputting an amplification signal adapting to a touch signal according to the intensity of the light field signal; and S30, amplifying the touch signal according to the amplification signal, and driving the light sensing touch panel.

In step 10, the function of measuring the ambient light field intensity of the light sensing touch panel is as follows. Because the signal to noise ratio of the touch signal of the light sensing touch panel is greatly affected by ambient light field, in regard to the driving circuit of the light sensing touch panel being turned on when there is no touch and being turned off when there is touch, the signal to noise ratio of the touch signal is higher when the intensity of the ambient light field is larger, and the signal to noise ratio of the touch signal is poor when the intensity of the ambient light field is weaker. Namely, the signal to noise ratio of the touch signal changes with the light field intensity. By measuring the ambient light field intensity of the light sensing touch panel, it can obtain the signal to noise ratio of the touch signal, and output the light field signal.

Referring to FIG. 2, the step S20 further comprises:

step S201, considering if the intensity of the light field signal is larger than the predetermined value of the stored light field signal, if it is YES, indicating that the light field signal is larger, then proceeding with the step S202 of choosing a first magnification from the stored amplification value to adapt to the touch signal; when considering if the intensity of the light field signal is not larger than the predetermined value of the stored light field signal, then proceeding with the step S203 of choosing a second magnification from the stored amplification value to adapt to the touch signal; wherein, the step S20 further comprises step S205 of the first magnification being larger than the second magnification.

In the present embodiment, the function of the first magnification being larger than the second magnification is as follows. When the light field signal is stronger, indicating that the external ambient light or background light is higher and the signal to noise ratio thereof is relatively low, such as 10 dB, then the larger magnification adapt to the touch signal, which allows the signal to noise ratio to achieve an appropriate level, such as 5 dB. When the light field signal is weaker, indicating that the external ambient light or background light is lower and the signal to noise ratio thereof is relatively high, such as 40 dB-50 dB, then the smaller magnification adapt to the touch signal, which allows the signal to noise ratio to achieve an appropriate level, such as 15 dB. Namely, make judgments according to the intensity of the light field, and choose an appropriate magnification to adapt to the touch signal, which can avoid the problems of too large magnification leading to the increase of the power consumption, or too less magnification leading to low sensitivity of the light sensing touch panel especially in the light field with larger signal to noise ratio.

Specifically, it can adjust the magnification value to adapt to the touch signal. For example, increasing or decreasing the magnification value through an external switch, and outputting an appropriate magnification to adapt to the touch signal, can also achieve the same technical effects.

In an another embodiment of the step S20, which is mainly applied in the step S204 of the driving circuit of the light sensing touch panel being turned on when there is no touch and being turned off when there is touch, the selected magnification value is contrary to the first embodiment mentioned above. Specifically, consider if the intensity of the light field signal is larger than the predetermined value of the stored light field signal, if it is YES, choose a first magnification from the stored amplification value to adapt to the touch signal; if it is No, choose a second magnification from the stored amplification value to adapt to the touch signal; wherein, the step S20 further comprises step S205 of the first magnification being smaller than the second magnification.

Step S30, adjust the amplification value to adapt to the touch signal to drive the light sensing touch panel.

In the low-power driving control method of light sensing touch panel according to the present embodiment, it chooses the amplification value of the touch signal of the light sensing touch panel according to the intensity of ambient light, and further reduces the power consumption of the light sensing touch panel.

Figure 3:
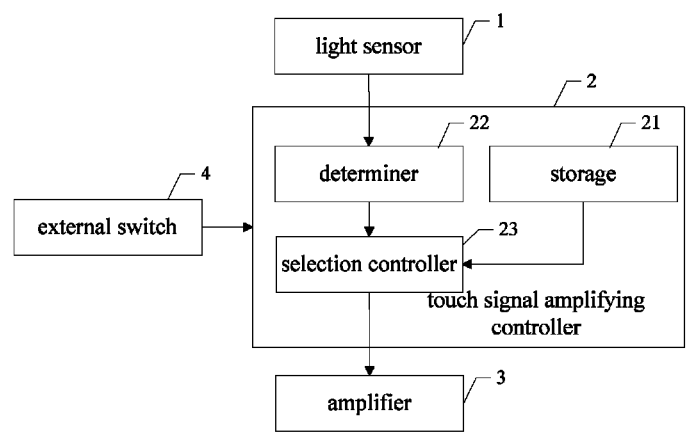
FIG. 3 is a schematic view illustrating the structure of the driving circuit of the light sensing touch panel according to the present invention.
Figure 4:
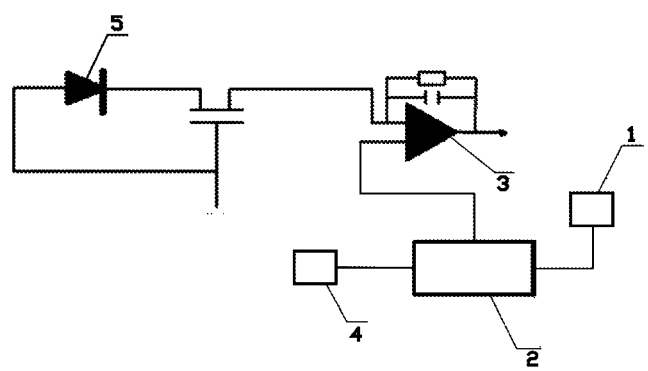
FIG. 4 is a circuit diagram of the driving circuit of the light sensing touch panel according to the present invention.
Figure 5:
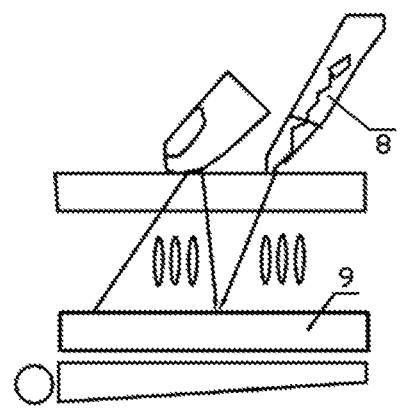
FIG. 5 is a schematic view illustrating the use of the photosensitive type in-cell touch technology according to the existing technology.

Referring to FIGS. 3 and 4, they are the embodiments of the driving circuit of the light sensing touch panel according to the present invention.

The light sensing touch panel according to the present embodiment comprises a driving circuit. The driving circuit is turned on when there is no touch on the light sensing touch panel and is turned off when there is touch on the light sensing touch panel.

The driving circuit at least comprises: a light sensor 1, which is used to measure the ambient light field intensity of the light sensing touch panel and output a light field signal; a touch signal amplifying controller 2, which is used to output an amplification signal adapting to a touch signal according to the intensity of the light field signal; and an amplifier 3, which is used to amplify the touch signal according to the amplification signal and drive the light sensing touch panel. Wherein, the light sensor 1, the touch signal amplifying controller 2, and the amplifier 3 are connected in sequence.

The function of the light sensor 1 is to measure the ambient light field intensity of the light sensing touch panel. Because the signal to noise ratio of the touch signal of the light sensing touch panel is greatly affected by ambient light field, in regard to the driving circuit of the light sensing touch panel being turned on when there is no touch and being turned off when there is touch, the signal to noise ratio of the touch signal is higher when the intensity of the ambient light field is larger, and the signal to noise ratio of the touch signal is poor when the intensity of the ambient light field is weaker. Namely, the signal to noise ratio of the touch signal changes with the light field intensity. By measuring the ambient light field intensity of the light sensing touch panel, it can obtain the signal to noise ratio of the touch signal, and output the light field signal.

Furthermore, the touch signal amplifying controller 2 comprises: a storage 21, which is used to store the amplification value; a determiner 22, which is used to consider the intensity of the light field signal according to the light field signal; a selection controller 23, which is used to choose a magnification adapting to the touch signal, the storage 21 and the determiner 22 being respectively connected with the selection controller 23. Wherein, the determiner 22 considers if the intensity of the light field signal is larger than the predetermined value of the stored light field signal, if it is YES, indicating the light field signal is stronger, the selection controller 23 chooses a first magnification from the amplification value stored in the storage 21 to adapt to the touch signal; if the determiner 22 considers that the intensity of the light field signal is not larger than the predetermined value of the stored light field signal, the selection controller 23 chooses a second magnification from the amplification value stored in the storage 21 to adapt to the touch signal; wherein, the first magnification is larger than the second magnification.

In the present embodiment, the function of the first magnification being larger than the second magnification, which is selected by the touch signal amplifying controller 2, is as follows. When the light field signal is stronger, indicating that the external ambient light or background light is higher and the signal to noise ratio thereof is relatively low, such as 10 dB, then the larger magnification adapt to the touch signal, which allows the signal to noise ratio to achieve an appropriate level, such as 5 dB. When the light field signal is weaker, indicating that the external ambient light or background light is lower and the signal to noise ratio thereof is relatively high, such as 40 dB-50 dB, then the smaller magnification adapt to the touch signal, which allows the signal to noise ratio to achieve an appropriate level, such as 15 dB. Namely, the selection controller 23 of the touch signal amplifying controller 2 can make judgments according to the intensity of the light field, and choose an appropriate magnification to adapt to the touch signal, which can avoid the problems of too large magnification leading to the increase of the power consumption, or too less magnification leading to low sensitivity of the light sensing touch panel especially in the light field with larger signal to noise ratio.

Furthermore, the touch signal amplifying controller 2 is further connected with an external switch 4 used to adjust the amplification value to adapt to the touch signal. By adjusting the external switch 4, the touch signal amplifying controller 2 chooses the amplification value to adapt to the touch signal, and outputs an amplification signal adapting to the touch signal.

In addition, the driving circuit further comprises a photodiode 5 connected to the amplifier. The function of the photodiode 5 is to convert the driving circuit, so that the driving circuit can be turned off when there is no touch on the light sensing touch panel and is turned on when there is touch on the light sensing touch panel. In the embodiment, the magnification value selected by the touch signal amplifying controller 2 is contrary to the embodiment mentioned above. Specifically, the determiner 22 considers if the intensity of the light field signal is larger than the predetermined value of the stored light field signal, if it is YES, the selection controller 23 chooses a first magnification from the amplification value stored in the storage 21 to adapt to the touch signal; if the determiner 22 considers that the intensity of the light field signal is not larger than the predetermined value of the stored light field signal, the selection controller 23 chooses a second magnification from the amplification value stored in the storage 21 to adapt to the touch signal; wherein, the first magnification is smaller than the second magnification. In the embodiment, the structure of the light sensor 1, the touch signal amplifying controller 2, and the amplifier 3 provided in the driving circuit can still achieve the same technical effect as the above embodiment.

The light sensing touch panel and the low-power driving control method thereof according to the embodiment of the present invention have the following beneficial effects. Because the light sensor can measure the ambient light field intensity of the light sensing touch panel and output the light field signal to the touch signal amplifying controller, the touch signal amplifying controller outputs an amplification signal adapting to the touch signal according to the intensity of the light field signal, the amplifier amplifies the touch signal according to the amplification signal and drives the light sensing touch panel, which avoids the high power consumption problems of the touch panel resulted from using the default magnification to amplify the signal. It can reduce the power consumption of the touch panel without affecting the touch sensitivity.

What is claimed is:

1. A light sensing touch panel, which comprises a driving circuit, wherein, the driving circuit at least comprises:
   a light sensor, which is used to measure the ambient light field intensity of the light sensing touch panel and output a light field signal;
   a touch signal amplifying controller, which is used to output an amplification signal adapting to a touch signal according to the intensity of the light field signal; and
   an amplifier, which is used to amplify the touch signal according to the amplification signal and drive the light sensing touch panel;
   wherein, the light sensor, the touch signal amplifying controller, and the amplifier are connected in sequence;
   wherein the touch signal amplifying controller comprises:
   a storage, which is used to store the amplification value;
   a determiner, which is used to consider the intensity of the light field signal according to the light field signal; and
   a selection controller, which is used to choose a magnification adapting to the touch signal, the storage and the determiner being respectively connected with the selection controller;
   wherein, the driving circuit of the light sensing touch panel is turned on when there is no touch and is turned off when there is touch; the determiner considers if the intensity of the light field signal is larger than the predetermined value of the stored light field signal, if it is YES, choose a first magnification from the stored amplification value to adapt to the touch signal; if it is No, choose a second magnification from the stored amplification value to adapt to the touch signal;
   wherein, the first magnification is larger than the second magnification.

2. The light sensing touch panel as claimed in claim 1, wherein the touch signal amplifying controller is further connected with an external switch used to adjust the amplification value to adapt to the touch signal.

3. The light sensing touch panel as claimed in claim 1, wherein the driving circuit further comprises a photodiode connected to the amplifier.

4. The light sensing touch panel as claimed in claim 1, wherein the touch signal amplifying controller is further connected with an external switch used to adjust the amplification value to adapt to the touch signal.

5. The light sensing touch panel as claimed in claim 1, wherein the driving circuit further comprises a photodiode connected to the amplifier.

6. The light sensing touch panel as claimed in claim 1, wherein the driving circuit of the light sensing touch panel is turned off when there is no touch and is turned on when there is touch; the determiner considers if the intensity of the light field signal is larger than the predetermined value of the stored light field signal, if it is YES, choose a first magnification from the stored amplification value to adapt to the touch signal; if it is No, choose a second magnification from the stored amplification value to adapt to the touch signal; wherein, the first magnification is smaller than the second magnification.

* * * * *